United States Patent
Xiong et al.

(10) Patent No.: US 12,204,850 B2
(45) Date of Patent: Jan. 21, 2025

(54) SEMANTIC PARSING FOR SHORT TEXT

(71) Applicant: LEMON INC., Grand Cayman (KY)

(72) Inventors: Hongyu Xiong, Los Angeles, CA (US); Han Wang, Los Angeles, CA (US); Rui Li, Los Angeles, CA (US); Yiqi Feng, Los Angeles, CA (US); Yuan Gao, Los Angeles, CA (US); Xiangyu Zeng, Los Angeles, CA (US); Qingyi Lu, Los Angeles, CA (US); Bin Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 330 days.

(21) Appl. No.: 17/728,248

(22) Filed: Apr. 25, 2022

(65) Prior Publication Data

US 2023/0342544 A1  Oct. 26, 2023

(51) Int. Cl.
*G06F 40/211* (2020.01)
*G06F 16/33* (2019.01)
*G06F 40/14* (2020.01)
*G06F 40/30* (2020.01)

(52) U.S. Cl.
CPC ........ *G06F 40/211* (2020.01); *G06F 16/3344* (2019.01); *G06F 40/14* (2020.01); *G06F 40/30* (2020.01)

(58) Field of Classification Search
None
See application file for complete search history.

(56) References Cited

U.S. PATENT DOCUMENTS

| 2016/0085853 A1 | 3/2016 | Zelevinsky et al. |
| 2021/0406475 A1* | 12/2021 | Tang ........................ G06F 16/36 |
| 2022/0180056 A1* | 6/2022 | Hong ........................ G06F 9/547 |

FOREIGN PATENT DOCUMENTS

CN    110245357 A    9/2019

OTHER PUBLICATIONS

International Search Report mailed Oct. 30, 2023 for International Application No. PCT/SG2023/050249.
Parse tree—Wikipedia, Apr. 19, 2022 [Retrieved on Oct. 16, 2023 from http://web.archive.org/web/20220419111017/https:/en.wikipedia.org/wiki/Parse_tree].

* cited by examiner

*Primary Examiner* — Stella L. Woo
(74) *Attorney, Agent, or Firm* — Faegre Drinker Biddle & Reath LLP (57) ABSTRACT

Embodiments of the present disclosure relate to semantic parsing for short text. According to embodiments of the present disclosure, a method is proposed. The method comprises: obtaining a set of sentences associated with a short text, each of the set of sentences containing all of words in the short text; determining a set of syntactic features associated with the set of sentences, each of the set of syntactic features indicating at least one of a constituency relation and a dependency relation of the corresponding sentence; and determining a semantic structure of the short text based on the set of syntactic features.

20 Claims, 8 Drawing Sheets

SEMANTIC PARSING FOR SHORT TEXT

FIELD

Embodiments of the present disclosure relates generally to computer techniques, and more particularly, to language processing.

BACKGROUND

With rapid development of the Internet, a large number of short texts emerge on various platforms, such as blogs, forums and chatting software. Examples of short text can be found in a number of contexts such as chat messages, search queries, product descriptions, or online reviews. These short texts carry a wealth of information, e.g., data information. Short text is sparse with a low number of features and doesn't provide enough word co-occurrence, which poses a great challenge for using existing natural language processing (NLP) methods to parse the short text.

SUMMARY

Embodiments of the present disclosure provide a solution for parsing a short text.

In a first aspect, a method is proposed. The method comprises: obtaining a set of sentences associated with a short text, each of the set of sentences containing all of words in the short text; determining a set of syntactic features associated with the set of sentences, each of the set of syntactic features indicating at least one of a constituency relation and a dependency relation of the corresponding sentence; and determining a semantic structure of the short text based on the set of syntactic features. The method in accordance with the first aspect of the present disclosure is capable of determining a semantic structure of the short text through utilizing the existing NLP technology. Thereby, compared with the conventional solution, the method in accordance with the first aspect of the present disclosure makes it possible to parse a short text with improved accuracy at lower cost.

In a second aspect, a system is proposed. The system comprises: at least one processor; and at least one memory communicatively coupled to the at least one processor and comprising computer-readable instructions that upon execution by the at least one processor cause the at least one processor to perform a method in accordance with the first aspect of the present disclosure.

In a third aspect, a non-transitory computer-readable storage medium is proposed. The non-transitory computer-readable storage medium stores computer-readable instructions that upon execution by a computing device cause the computing device to perform a method in accordance with the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent, wherein.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
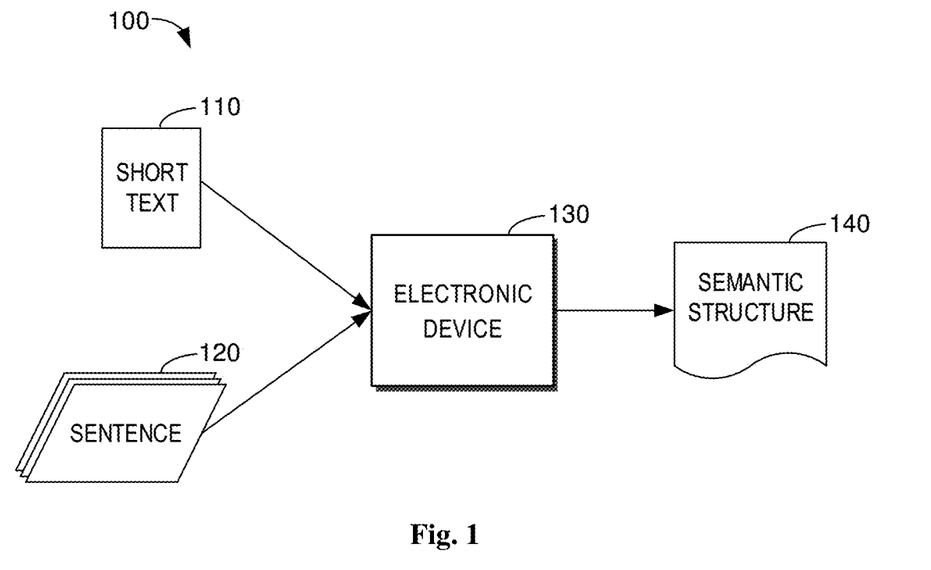
FIG. 1 illustrates a block diagram of an example environment in accordance with some embodiments of the present disclosure.

FIG. 1 illustrates a block diagram of an example environment 100 in accordance with some embodiments of the present disclosure. As shown in FIG. 1, an example environment 100 may generally include an electronic device 130. In some embodiments, electronic device 130 may be a device capable of computing such as a personal computer, workstation, server, or the like. The scope of the present disclosure is not limited in this respect.

The electronic device 130 may receive a short text 110 to be parsed as input. As used herein, the term "short text" refers to a text that lacks at least a part of elements that constitute a sentence. For ease of discussion, the short text "restaurant robot" will be used as an exemplary short text herein. It should be understood that the solution proposed herein can be applied to any other suitable short text. The scope of the present disclosure is not limited in this respect.

The electronic device 130 may further receive a set of sentences 120 associated with the short text 110 as input. Each of the set of sentences 120 containing all of words in the short text 110. In the case that the short text 110 is "restaurant robot", examples of the sentences comprise, but are not limited to, "Some restaurant people see robots as the end of the industry." and "A restaurant robot from this California company offers the best experience.".

The electronic device 130 may determine a semantic structure 140 of the short text 110 based on the set of syntactic features. This will be described in further detail below with reference to FIGS. 2-10.

Figure 2:
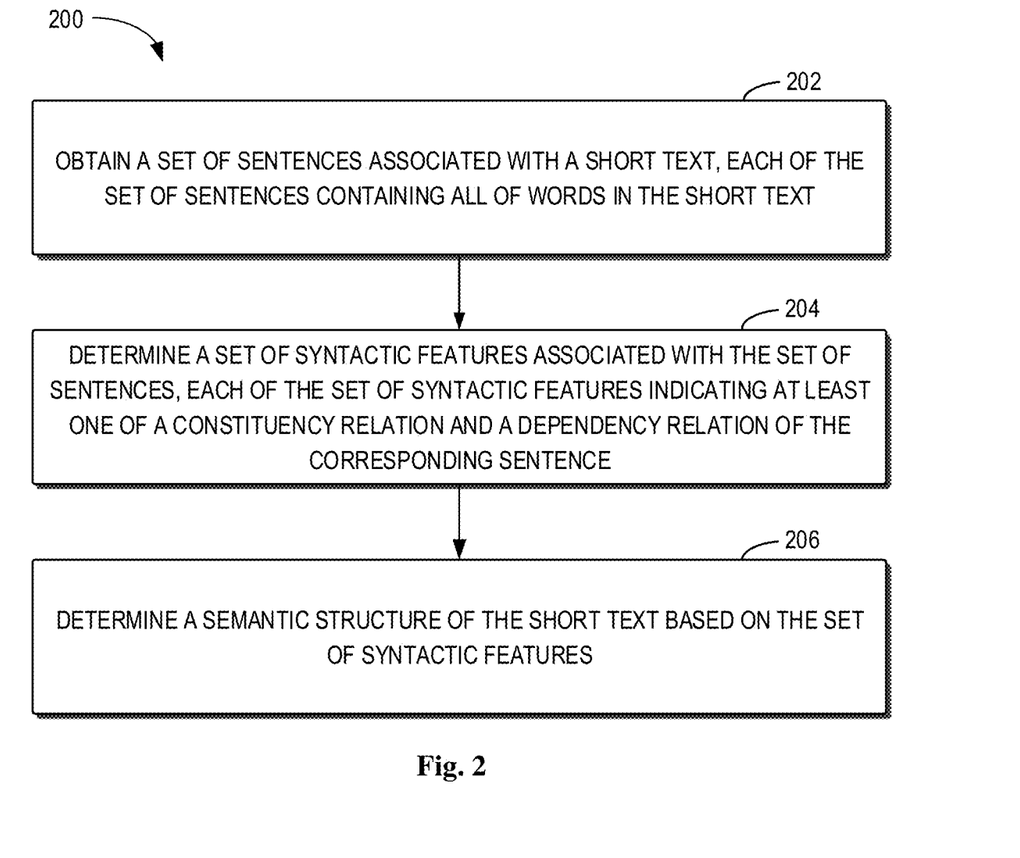
FIG. 2 illustrates a flowchart of a method for parsing a short text in accordance with some example embodiments of the present disclosure.

FIG. 2 illustrates a flowchart of a method 200 for parsing a short text 110 in accordance with some example embodiments of the present disclosure. For example, the method 200 may be performed by the electronic device 130 as shown in FIG. 1. It should be understood that the method 200 may also include additional blocks not shown, and/or blocks shown may be omitted. The scope of the present disclosure is not limited in this respect.

At block 202, the electronic device 130 obtains a set of sentences 120 associated with a short text 110, each of the set of sentences 120 containing all of words in the short text 110. In some embodiments, the set of sentences 120 can be obtained from an external device. In some embodiments, the electronic device 130 may acquire the set of sentences 120 from a preset database. By way of example, the short text 110 may correspond to a search query. The electronic device 130 may extract a set of documents, such as a set of webpages, associated with the search query from a search log. As used herein, the term "search log" refers to a database which records the search results associated with a search query. That is, information contained in a search log is clustered based on a search query. Then, the electronic device 130 may search for a set of sentences 120 associated with the short text 110, each of the set of sentences 120 containing all of words in the short text 110. It should be understood that the electronic device 130 may also acquire the set of sentences 120 in any other suitable manner. The scope of the present disclosure is not limited in this respect.

Moreover, it should be appreciated that different variations of a word may be regard as a same word. Different variations of a word comprise, but are not limited to, plural form, gerund and conjugation of the word. For example, the words "restaurants" and "restaurant" may be regard as a same word. The words "offer", "offers", and "offering" may be regard as a same word. It should be understood that any other suitable variations of a word may also be regard as a same word. The scope of the present disclosure is not limited in this respect.

At block 204, the electronic device 130 determines a set of syntactic features associated with the set of sentences 120, each of the set of syntactic features indicating at least one of a constituency relation and a dependency relation of the corresponding sentence. In some embodiments, the electronic device 130 may parse at least one of the set of sentences 120 using an existing natural language processing technology, e.g., Stanford NLP Parser, to obtain the constituency relation of a sentence. In some embodiments, the electronic device 130 may parse at least one of the set of sentences 120 using an existing natural language processing technology, e.g., Stanford NLP Parser, to obtain the dependency relation of a sentence. In some embodiments, both the constituency relation and the dependency relation may be obtained for at least one of the set of sentences 120. It should be understood that the electronic device 130 may also determine the set of syntactic features in any other suitable manner. The scope of the present disclosure is not limited in this respect.

In some embodiments, each of the set of syntactic features may be organized and presented in form of a hierarchical structure, e.g. a tree structure. By way of example, the constituency relation may be presented in form of a constituency tree, and the dependency relation may be presented in form of a dependency tree. This will be described in further detail with reference to FIGS. 3-4.

Figure 3:
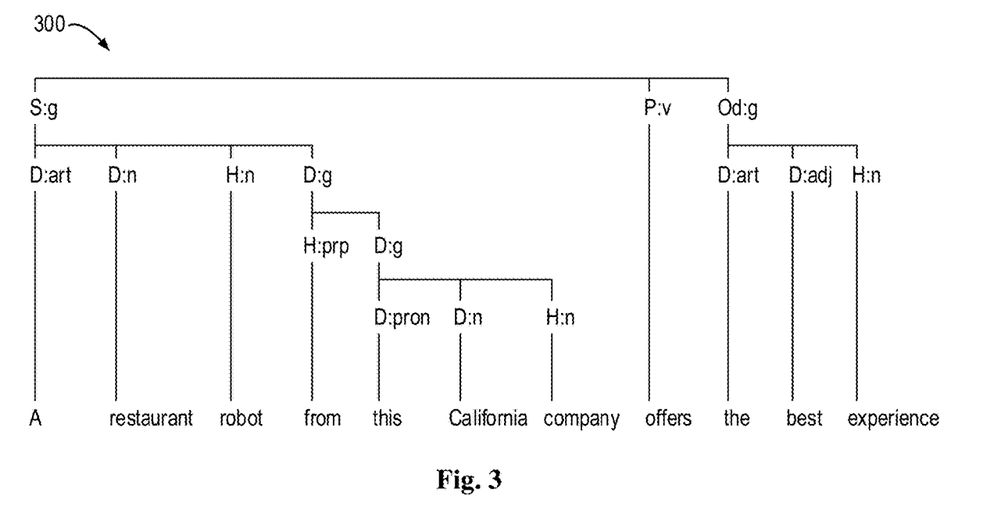
FIG. 3 illustrates a diagram of a constituency tree of a sentence.

FIG. 3 illustrates a diagram of a constituency tree 300 of a sentence. The sentence shown in FIG. 3 is "A restaurant robot from this California company offers the best experience." As shown in FIG. 3, the constituency tree 300 contains the words of the sentence as its leaf nodes. Meanwhile, each word is associated with at least one tag which indicates the constituent and part-of-speech of the word or a phrase containing the word. In FIG. 3, the tag is shown in a format of "X:Y", wherein "X" indicates the constituent of the word or phrase, and "Y" indicates the part-of-speech of the word or phrase. For the purpose of clarity, the meanings of abbreviations used in the constituency tree 300 are listed in the following Table 1.

TABLE 1

| Abbreviations used in a constituency tree | |
|---|---|
| S | subject |
| P | predicate |
| Od | object |
| Co | complement |
| D | determiner |
| H | head |
| g | group |
| v | verb |
| n | noun |
| pron | pronoun |

TABLE 1-continued

Abbreviations used in a constituency tree

| | |
|---|---|
| prp | preposition |
| art | article |

For example, the tag "S:g" associated with the phrase "A restaurant robot from this California company" indicates that the constituent of the phrase is subject and the part-of-speech of the phrase is group. The tag "H:n" associated with the word "robot" indicates that the constituent of the word is head and the part-of-speech of the word is noun. It should be understood that the constituency relation of a sentence may be organized and presented in any other suitable manner. The scope of the present disclosure is not limited in this respect.

Figure 4:
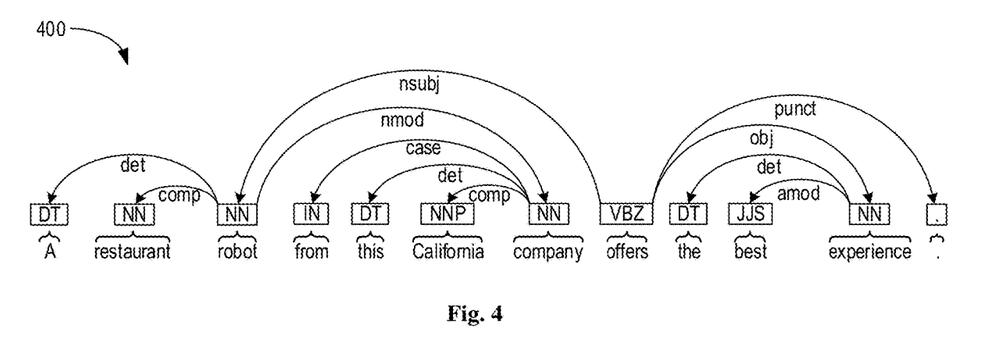
FIG. 4 illustrates a diagram of a dependency tree of the sentence shown in FIG. 3.

FIG. 4 illustrates a diagram of a dependency tree 400 of the sentence shown in FIG. 3. The dependency tree 400 express the syntax of the sentence in terms of dependencies between words—that is, directed, typed edges between words in a graph. More formally, a dependency tree is a graph G=(V, E) where the set of nodes V contains the words in the sentence, and each of the set of edges E connects two words in the sentence. The graph G satisfy following conditions: (1) there is a single root node with no incoming edges. It can be seen that the word "offers" having no incoming edges corresponds to the root node; (2) for each of the set of nodes V, there is a path from the root node to the respective node; (3) each node except the root node has exactly one incoming edge. For the purpose of clarity, the meanings of abbreviations used in the dependency tree 400 are listed in the following Table 2.

TABLE 2

Abbreviations used in a dependency tree

| | |
|---|---|
| DT | article |
| NN | noun |
| NNP | proper noun |
| IN | preposition |
| VBZ | verb |
| JJS | adjective, superlative |
| det | determiner |
| comp | compound |
| nsubj | nominal subject |
| nmod | nominal modifier |
| case | prepositional complement |
| obj | object |
| amod | adjectival modifier |
| punct | punctuation |

As shown in FIG. 4, each node has a tag indicting the part-of-speech of the corresponding word. For example, the tag "VBZ" associated with the word "offers" indicates that the part-of-speech of the word "offers" is verb. Similarly, the tag "NN" associated with the word "robot" indicates that the part-of-speech of the word "robot" is noun. Additionally, each edge has a type, which defines the grammatical relation that occurs between the two words. By way of example, the verb "offers" has an outgoing edge of type "nsubj" to the noun "robot", meaning that the word "robot" is a nominal subject of the word "offers". In this case, the word "robot" depends on the word "offers". The noun "robot" has an outgoing edge of type "nmod" to the noun "company", meaning that the word "company" is a nominal modifier of the word "robot". In this case, the word "company" depends on the word "robot". It should be understood that the dependency relation of a sentence may be organized and presented in any other suitable manner. The scope of the present disclosure is not limited in this respect.

Referring back to FIG. 2, at block 206, the electronic device 130 determines a semantic structure 140 of the short text 110 based on the set of syntactic features. This will be discussed in further detail with reference to FIGS. 5-10.

Figure 5:
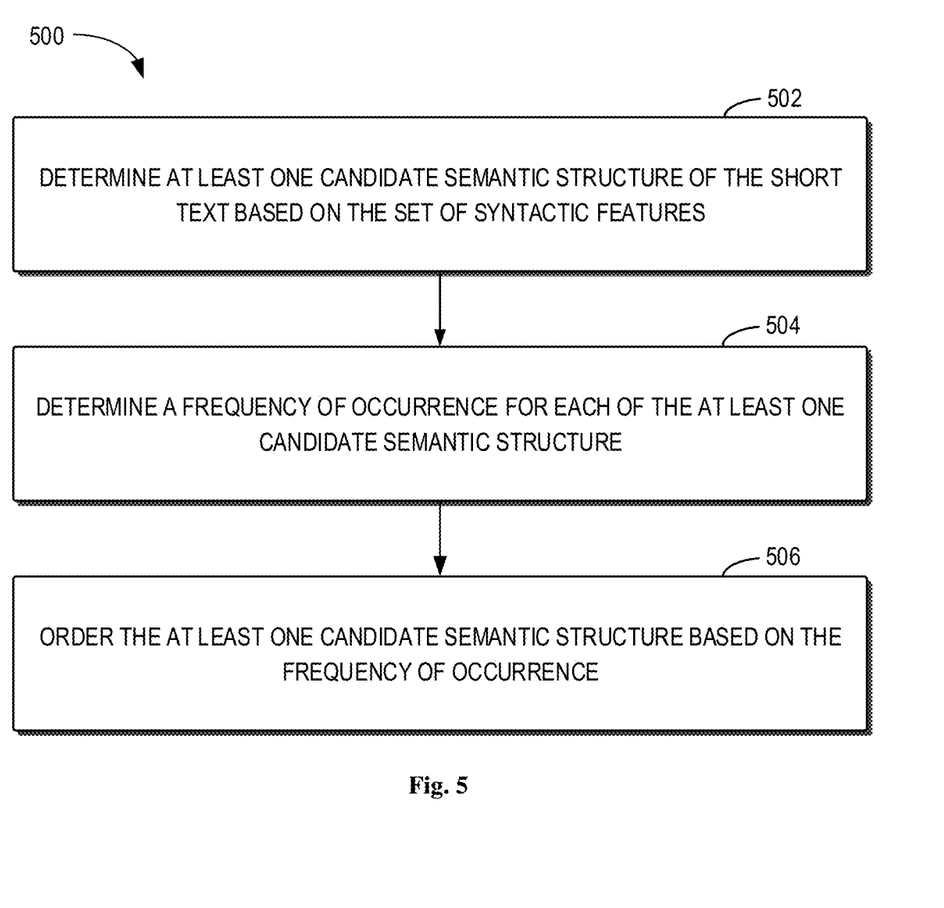
FIG. 5 illustrates a flowchart of a method for determining a semantic structure of a short text in accordance with some example embodiments of the present disclosure.

FIG. 5 illustrates a flowchart of a method 500 for determining a semantic structure 140 of a short text 110 in accordance with some example embodiments of the present disclosure. For example, method 500 may corresponds to an example implementation of block 206 as shown in FIG. 2. In some embodiments, the method 500 may be performed by the electronic device 130 as shown in FIG. 1. It should be understood that the method 500 may also include additional blocks not shown, and/or blocks shown may be omitted. The scope of the present disclosure is not limited in this respect.

At block 502, the electronic device 130 determines at least one candidate semantic structure of the short text 110 based on the set of syntactic feature. For ease of discussion, a target sentence, which may be any sentence in the set of sentences 120, will be taken as an example below. In this case, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence. In order to determine the target candidate semantic structure, the electronic device 130 may determine a sub-tree from the target constituency tree, leaf nodes of the sub-tree consisting of all of the words in the short text 110. The electronic device 130 may further reconstruct the sub-tree to obtain the target candidate semantic structure.

Figure 6:
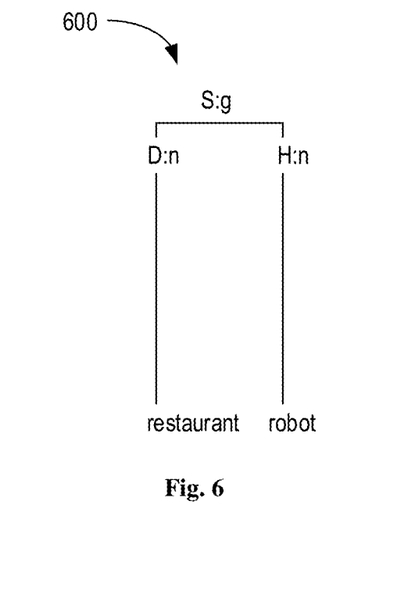
FIG. 6 illustrates a sub-tree extracted from the constituency tree shown in FIG. 3 in accordance with some example embodiments of the present disclosure.

By way of example, for the sentence shown in FIG. 3, the electronic device 130 may extract a sub-tree from the constituency tree 300. FIG. 6 illustrates a sub-tree 600 extracted from the constituency tree 300 shown in FIG. 3 in accordance with some example embodiments of the present disclosure. It is seen that the leaf nodes of sub-tree 600 consists of all of the words in the short text "restaurant robot". The electronic device 130 may further reconstruct the sub-tree 600 to obtain a candidate semantic structure for the short text "restaurant robot".

In some embodiments, for restructuring the sub-tree, the electronic device 130 may determine whether all of the words in the short text 110 belong to a same constituent. In response to a determination that all of the words in the short text 110 belong to a same constituent, the electronic device 130 may determine a root node of the sub-tree based on the target syntactic feature, and determine a part-of-speech for the short text 110. In some embodiments, the electronic device 130 may determine the root node of the sub-tree based on a target dependency tree indicating the dependency relation of the target sentence.

Figure 7:
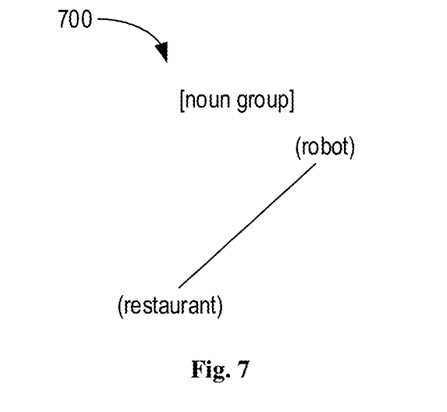
FIG. 7 illustrates a restructured tree associated with the sub-tree shown in FIG. 6 in accordance with some example embodiments of the present disclosure.

By way of example, for the sentence shown in FIG. 3, it can be seen from the extracted sub-tree 600 shown in FIG. 6 that the words "restaurant" and "robot" belong to a same constituent, i.e., subject. In this case, the electronic device 130 may determine the root node of the sub-tree 600 based on the dependency tree 400 shown in FIG. 4. As shown in FIG. 4, the word "robot" has an outgoing edge of type "comp" to the noun "restaurant", meaning that the word "restaurant" is a compound of the word "robot". In this case, the word "restaurant" depends on the word "robot". As such, the word "robot" may be taken as the root node of the sub-tree 600 and the part-of-speech for the short text "restaurant robot" can be determined as noun group. FIG. 7 illustrates a restructured tree 700 associated with the sub-tree 600 shown in FIG. 6 in accordance with some example embodiments of the present disclosure. As shown in FIG. 7, the root node of the restructured tree 700 is the word "restaurant" and the part-of-speech for the short text "restaurant robot" is tagged as noun group.

In some embodiments, for restructuring the sub-tree, the electronic device 130 may determine whether a part of the short text 110 belongs to a subject and another part of the short text 110 belongs to an object or an adverb. In response to a determination that a part of the short text 110 belongs to a subject and another part of the short text 110 belongs to an object or an adverb, the electronic device 130 may determine a predicate as a root node of the sub-tree, and determine a constituent and a part-of-speech for each of the words based on the target constituency tree. In this manner, when the sentence is complex, e.g., comprises one or more clauses, the above process can be performed recursively. That, is, the electronic device 130 may break down the original sentence into two or more sub-sentences of the same or related type, until the resulted sub-sentence become simple enough to be processed directly. Thereby, the method in accordance with some embodiments of the present disclosure makes it possible to parse a short text more efficiently while using fewer resources.

Figure 8:
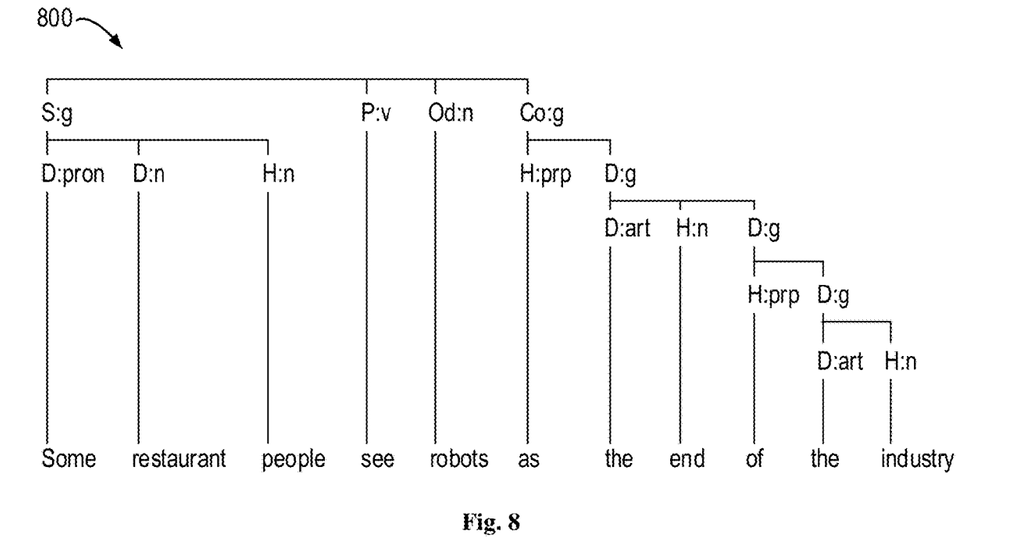
FIG. 8 illustrates a diagram of a constituency tree of another sentence.

For the purpose of illustration, a sentence "Some restaurant people see robots as the end of the industry." is taken as an example for the discussion below. FIG. 8 illustrates a diagram of a constituency tree 800 of this sentence. As stated with reference to FIG. 3, the constituency tree 800 contains the words of the sentence as its leaf nodes. Similarly, each word is associated with at least one tag which indicates the constituent and part-of-speech of the word or a phrase containing the word. The meanings of abbreviations used in the constituency tree 800 can be found the above Table 1. For example, the tag "D:pron" associated with the word "some" indicates that the constituent of the word is determiner and the part-of-speech of the word is pronoun. The tag "S:g" associated with the phrase "some restaurant people" indicates that constituent of the phrase is subject and the part-of-speech of the phrase is group.

Figure 9:
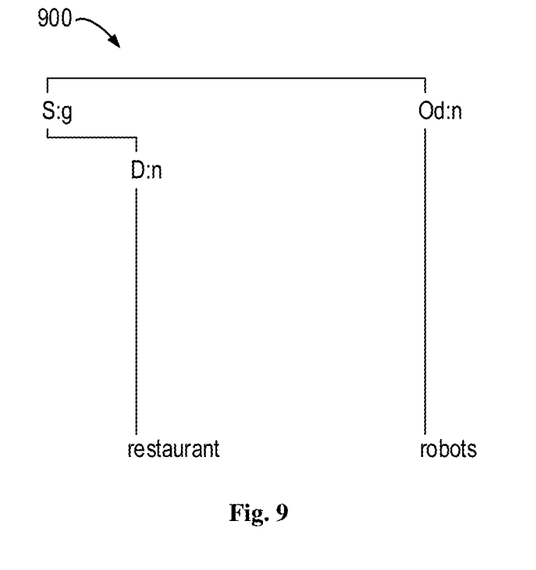
FIG. 9 illustrates a sub-tree extracted from the constituency tree shown in FIG. 8 in accordance with some example embodiments of the present disclosure.
Figure 10:
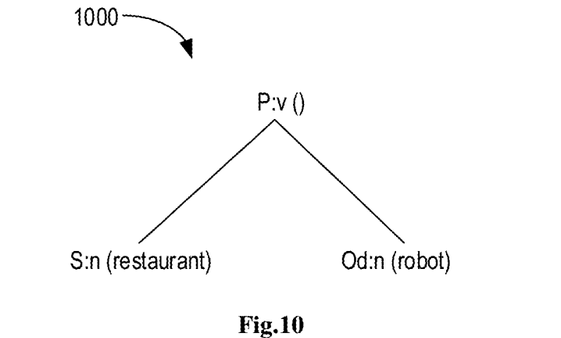
FIG. 10 illustrates a restructured tree associated with the sub-tree shown in FIG. 9 in accordance with some example embodiments of the present disclosure.

In some embodiments, the electronic device 130 may determine a sub-tree from the constituency tree 800, leaf nodes of the sub-tree consisting of all of the words in the short text 110. FIG. 9 illustrates a sub-tree 900 extracted from the constituency tree 800 shown in FIG. 8 in accordance with some example embodiments of the present disclosure. It is seen that the leaf nodes of the sub-tree 900 consists of all of the words in the short text "restaurant robot". The electronic device 130 may further reconstruct the sub-tree 900 to obtain a candidate semantic structure for the short text "restaurant robot". As can be seen from FIG. 9, the words "restaurant" belongs to a subject, while the word "robots" belongs to an object. In this case, the electronic device 130 may determine a predicate as a root node of the sub-tree 900. The electronic device 130 may further determine a constituent and a part-of-speech for each of the words based on the constituency tree 800. For example, the constituent and the part-of-speech of the word "restaurant" may be determined as subject and noun, respectively. The constituent and the part-of-speech of the word "robot" may be determined as object and noun, respectively. FIG. 10 illustrates a restructured tree 1000 associated with the sub-tree 900 shown in FIG. 9 in accordance with some example embodiments of the present disclosure. As shown in FIG. 10, the root node of the restructured tree 700 is a predicate; the constituent and the part-of-speech are tagged for each word.

It should be understood that the electronic device 130 may determine the candidate semantic structure of the short text 110 based on the set of syntactic features in any other suitable manner. The scope of the present disclosure is not limited in this respect.

Referring back to FIG. 5, at block 504, the electronic device 130 determines a frequency of occurrence for each of the at least one candidate semantic structure. In some embodiments, the electronic device 130 may count the number of occurrence for each candidate semantic structure. It should be understood that the frequency of occurrence may be determined in any other suitable manner. The scope of the present disclosure is not limited in this respect.

At block 506, the electronic device 130 orders the at least one candidate semantic structure based on the frequency of occurrence. In some embodiment, the electronic device 130 may orders the at least one candidate semantic structure in descending order based on the frequency of occurrence. Alternatively, the electronic device 130 may orders the at least one candidate semantic structure in ascending order based on the frequency of occurrence. Thereby, the method in accordance with the first aspect of the present disclosure may provide information about the possibilities of the respective candidate semantic structure, which improves the accuracy of the parsing result of the short text.

It should be understood that the electronic device 130 may organize the at least one candidate semantic structure in any other suitable manner. The scope of the present disclosure is not limited in this respect.

In some embodiment, the electronic device 130 may output all of the at least one candidate semantic structure together with their frequency of occurrence. In some embodiment, the electronic device 130 may output one of the at least one candidate semantic structure that has the highest frequency of occurrence as the semantic structure 140 of the short text 110. In some embodiment, the electronic device 130 may determine one of the at least one candidate semantic structure as the semantic structure 140 of the short text 110 in any other suitable manner. The scope of the present disclosure is not limited in this respect.

It should be understood that although the method in accordance with some example embodiments of the present disclosure are illustrate in the context of the short text "restaurant robot" and the sentences "Some restaurant people see robots as the end of the industry." and "A restaurant robot from this California company offers the best experience.", the method in accordance with some example embodiments of the present disclosure may also be applied to any other suitable short texts and sentences. The scope of the present disclosure is not limited in this respect.

As discussed above, a method for parsing a short text is proposed herein, which is capable of determining a semantic structure of the short text through utilizing the existing NLP technology. Compared with the conventional solution, the method in accordance with some example embodiments of the present disclosure makes it possible to parse a short text with improved accuracy at lower cost, which may facilitate the text mining, information retrieval, and the building of knowledge graph.

Figure 11:
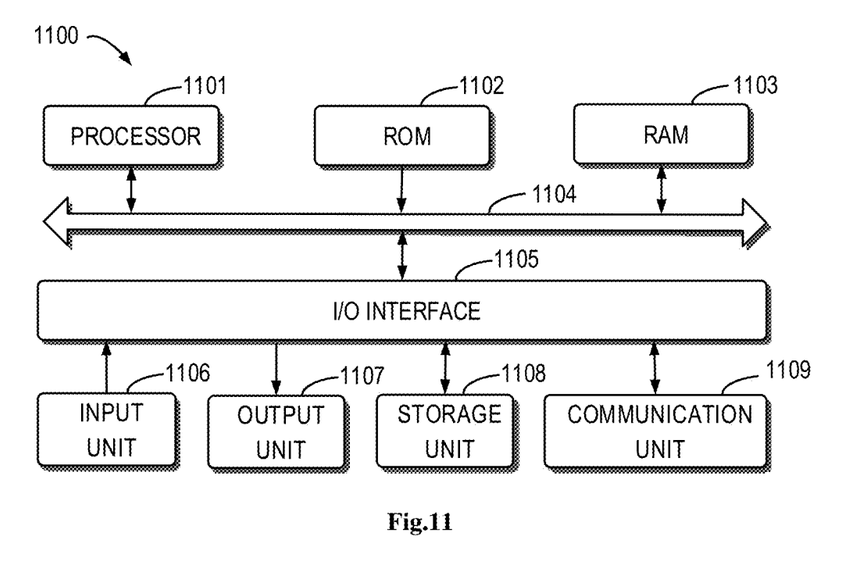
FIG. 11 illustrates a block diagram of an example computing system/device suitable for implementing example embodiments of the present disclosure.

FIG. 11 illustrates a block diagram of an example computing system/device 1100 suitable for implementing example embodiments of the present disclosure. The electronic device 130 shown in FIG. 1 may be implemented as or included in the system/device 1100. The system/device 1100 may be a general-purpose computer, a physical computing device, or a portable electronic device, or may be practiced in distributed cloud computing environments where tasks are performed by remote processing devices that are linked through a communication network. The system/device 1100 can be used to implement any of the processes described herein.

As depicted, the system/device 1100 includes a processor 1101 which is capable of performing various processes according to a program stored in a read only memory (ROM) 1102 or a program loaded from a storage unit 1108 to a random access memory (RAM) 1103. In the RAM 1103, data required when the processor 1101 performs the various processes or the like is also stored as required. The processor 1101, the ROM 1102 and the RAM 1103 are connected to one another via a bus 1104. An input/output (I/O) interface 1105 is also connected to the bus 1104.

The processor 1101 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 1100 may have multiple processors, such as an application-specific integrated circuit chip that is slaved in time to a clock which synchronizes the main processor.

A plurality of components in the system/device 1100 are connected to the I/O interface 1105, including an input unit 1106, such as a keyboard, a mouse, or the like; an output unit 1107 including a display such as a cathode ray tube (CRT), a liquid crystal display (LCD), or the like, and a loudspeaker or the like; the storage unit 1108, such as disk and optical disk, and the like; and a communication unit 1109, such as a network card, a modem, a wireless transceiver, or the like. The communication unit 1109 allows the system/device 1100 to exchange information/data with other devices via a communication network, such as the Internet, various telecommunication networks, and/or the like.

The methods and processes described above, such as the method 200, can also be performed by the processor 1101. In some embodiments, the method 200 can be implemented as a computer software program or a computer program product tangibly included in the computer readable medium, e.g., storage unit 1108. In some embodiments, the computer program can be partially or fully loaded and/or embodied to the system/device 1100 via ROM 1102 and/or communication unit 1109. The computer program includes computer executable instructions that are executed by the associated processor 1101. When the computer program is loaded to RAM 1103 and executed by the processor 1101, one or more acts of the method 200 described above can be implemented. Alternatively, processor 1101 can be configured via any other suitable manners (e.g., by means of firmware) to execute the method 200 in other embodiments.

In some example embodiments of the present disclosure, there is provided a computer program product comprising instructions which, when executed by a processor of an apparatus, cause the apparatus to perform steps of any one of the methods described above.

In some example embodiments of the present disclosure, there is provided a computer readable medium comprising program instructions for causing an apparatus to perform at least steps of any one of the methods described above. The computer readable medium may be a non-transitory computer readable medium in some embodiments.

In some example embodiments of the present disclosure, there is provided a computer readable medium comprising program instructions for causing an apparatus to perform at least steps of any one of the methods described above. The computer readable medium may be a non-transitory computer readable medium in some embodiments.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representations, it will be appreciated that the blocks, apparatuses, systems, techniques, or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above. Generally, program modules include routines, programs, libraries, objects, classes, components, data structures, or the like that perform particular tasks or implement particular abstract types. The functionality of the program modules may be combined or split between program modules as desired in various embodiments. Computer-executable instructions for program modules may be executed within a local or distributed device. In a distributed device, program modules may be located in both local and remote storage media.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. The program code may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Implementations of the present disclosure can be described in view of the following clauses, the features of which can be combined in any reasonable manner.

Clause 1. A method, comprising: obtaining a set of sentences associated with a short text, each of the set of sentences containing all of words in the short text; determining a set of syntactic features associated with the set of sentences, each of the set of syntactic features indicating at least one of a constituency relation and a dependency relation of the corresponding sentence; and determining a semantic structure of the short text based on the set of syntactic features.

Clause 2. The method of Clause 1, wherein determining the semantic structure of the short text comprises: determining at least one candidate semantic structure of the short text based on the set of syntactic features; determining a frequency of occurrence for each of the at least one candidate semantic structure; and ordering the at least one candidate semantic structure based on the frequency of occurrence.

Clause 3. The method of Clause 2, wherein the set of sentences comprises a target sentence, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence, and determining the at least one candidate semantic structure comprises: determining a sub-tree from the target constituency tree, leaf nodes of the sub-tree consisting of all of the words in the short text; and restructuring the sub-tree to obtain the target candidate semantic structure.

Clause 4. The method of Clause 3, wherein restructuring the sub-tree comprises: in response to a determination that a part of the short text belongs to a subject and another part of the short text belongs to an object or an adverb, determining a predicate as a root node of the sub-tree; and determining a constituent and a part-of-speech for each of the words based on the target constituency tree.

Clause 5. The method of Clause 3, wherein restructuring the sub-tree comprises: in response to a determination that all of the words in the short text belong to a same constituent, determining a root node of the sub-tree based on the target syntactic feature; and determining a part-of-speech for the short text.

Clause 6. The method of Clause 5, wherein the target syntactic feature further comprises a target dependency tree indicating the dependency relation of the target sentence, and determining the root node comprises: determining the root node based on the target dependency tree.

Clause 7. The method of Clause 1, wherein the short text corresponds to a search query, and obtaining the set of sentences comprises: extracting a set of documents associated with the search query from a search log; and acquiring the set of sentences from the set of documents.

Clause 8. The method of Clause 1, wherein the set of sentences comprises a target sentence, determining the set of syntactic features comprises: parsing the target sentence to obtain at least one of the constituency relation and the dependency relation of the target sentence.

Clause 9. A system, comprising: at least one processor; and at least one memory communicatively coupled to the at least one processor and comprising computer-readable instructions that upon execution by the at least one processor cause the at least one processor to perform actions comprising: obtaining a set of sentences associated with a short text, each of the set of sentences containing all of words in the short text; determining a set of syntactic features associated with the set of sentences, each of the set of syntactic features indicating at least one of a constituency relation and a dependency relation of the corresponding sentence; and determining a semantic structure of the short text based on the set of syntactic features.

Clause 10. The system of Clause 9, wherein determining the semantic structure of the short text comprises: determining at least one candidate semantic structure of the short text based on the set of syntactic features; determining a frequency of occurrence for each of the at least one candidate semantic structure; and ordering the at least one candidate semantic structure based on the frequency of occurrence.

Clause 11. The system of Clause 10, wherein the set of sentences comprises a target sentence, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence, and determining the at least one candidate semantic structure comprises: determining a sub-tree from the target constituency tree, leaf nodes of the sub-tree consisting of all of the words in the short text; and restructuring the sub-tree to obtain the target candidate semantic structure.

Clause 12. The system of Clause 11, wherein restructuring the sub-tree comprises: in response to a determination that a part of the short text belongs to a subject and another part of the short text belongs to an object or an adverb, determining a predicate as a root node of the sub-tree; and determining a constituent and a part-of-speech for each of the words based on the target constituency tree.

Clause 13. The system of Clause 11, wherein restructuring the sub-tree comprises: in response to a determination that all of the words in the short text belong to a same constituent, determining a root node of the sub-tree based on the target syntactic feature; and determining a part-of-speech for the short text.

Clause 14. The system of Clause 13, wherein the target syntactic feature further comprises a target dependency tree indicating the dependency relation of the target sentence, and determining the root node comprises: determining the root node based on the target dependency tree.

Clause 15. The system of Clause 9, wherein the short text corresponds to a search query, and obtaining the set of sentences comprises: extracting a set of documents associated with the search query from a search log; and acquiring the set of sentences from the set of documents.

Clause 16. The system of Clause 9, wherein the set of sentences comprises a target sentence, determining the set of syntactic features comprises: parsing the target sentence to obtain at least one of the constituency relation and the dependency relation of the target sentence.

Clause 17. A non-transitory computer-readable storage medium, storing computer-readable instructions that upon execution by a computing device cause the computing device to perform actions comprising: obtaining a set of sentences associated with a short text, each of the set of sentences containing all of words in the short text; determining a set of syntactic features associated with the set of sentences, each of the set of syntactic features indicating at least one of a constituency relation and a dependency relation of the corresponding sentence; and determining a semantic structure of the short text based on the set of syntactic features.

Clause 18. The non-transitory computer-readable storage medium of Clause 17, wherein determining the semantic structure of the short text comprises: determining at least one candidate semantic structure of the short text based on the set of syntactic features; determining a frequency of occurrence for each of the at least one candidate semantic structure; and ordering the at least one candidate semantic structure based on the frequency of occurrence.

Clause 19. The non-transitory computer-readable storage medium of Clause 18, wherein the set of sentences comprises a target sentence, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence, and determining the at least one candidate semantic structure comprises: determining a sub-tree from the target constituency tree, leaf nodes of the sub-tree consisting of all of the words in the short text; and restructuring the sub-tree to obtain the target candidate semantic structure.

Clause 20. The non-transitory computer-readable storage medium of Clause 19, wherein restructuring the sub-tree comprises: in response to a determination that a part of the short text belongs to a subject and another part of the short text belongs to an object or an adverb, determining a predicate as a root node of the sub-tree; and determining a constituent and a part-of-speech for each of the words based on the target constituency tree.

Clause 21. The non-transitory computer-readable storage medium of Clause 19, wherein restructuring the sub-tree comprises: in response to a determination that all of the words in the short text belong to a same constituent, determining a root node of the sub-tree based on the target syntactic feature; and determining a part-of-speech for the short text.

Clause 22. The non-transitory computer-readable storage medium of Clause 21, wherein the target syntactic feature further comprises a target dependency tree indicating the dependency relation of the target sentence, and determining the root node comprises: determining the root node based on the target dependency tree.

Clause 23. The non-transitory computer-readable storage medium of Clause 17, wherein the short text corresponds to a search query, and obtaining the set of sentences comprises: extracting a set of documents associated with the search query from a search log; and acquiring the set of sentences from the set of documents.

Clause 24. The non-transitory computer-readable storage medium of Clause 17, wherein the set of sentences comprises a target sentence, determining the set of syntactic features comprises: parsing the target sentence to obtain at least one of the constituency relation and the dependency relation of the target sentence.

While operations are depicted in a particular order, this should not be understood as requiring that such operations be performed in the particular order shown or in sequential order, or that all illustrated operations be performed, to achieve desirable results. In certain circumstances, multi-tasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method, comprising:
    obtaining a set of sentences associated with a short text, each of the set of sentences containing all of words in the short text;
    determining a set of syntactic features associated with the set of sentences, each of the set of syntactic features indicating at least one of a constituency relation and a dependency relation of the corresponding sentence; and
    determining a semantic structure of the short text based on the set of syntactic features, the semantic structure comprising a constituent for each of the words.

2. The method of claim 1, wherein determining the semantic structure of the short text comprises:
    determining at least one candidate semantic structure of the short text based on the set of syntactic features;
    determining a frequency of occurrence for each of the at least one candidate semantic structure; and
    ordering the at least one candidate semantic structure based on the frequency of occurrence.

3. The method of claim 2, wherein the set of sentences comprises a target sentence, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence, and determining the at least one candidate semantic structure comprises:
    determining a sub-tree from the target constituency tree, leaf nodes of the sub-tree consisting of all of the words in the short text; and
    restructuring the sub-tree to obtain the target candidate semantic structure.

4. The method of claim 3, wherein restructuring the sub-tree comprises:
    in response to a determination that a part of the short text belongs to a subject and another part of the short text belongs to an object or an adverb,
        determining a predicate as a root node of the sub-tree; and
        determining the constituent and a part-of-speech for each of the words based on the target constituency tree.

5. The method of claim 3, wherein restructuring the sub-tree comprises:
    in response to a determination that all of the words in the short text belong to a same constituent,
        determining a root node of the sub-tree based on the target syntactic feature; and
        determining a part-of-speech for the short text.

6. The method of claim 5, wherein the target syntactic feature further comprises a target dependency tree indicating the dependency relation of the target sentence, and determining the root node comprises:
  determining the root node based on the target dependency tree.

7. The method of claim 1, wherein the short text corresponds to a search query, and obtaining the set of sentences comprises:
  extracting a set of documents associated with the search query from a search log; and
  acquiring the set of sentences from the set of documents.

8. The method of claim 1, wherein the set of sentences comprises a target sentence, determining the set of syntactic features comprises:
  parsing the target sentence to obtain at least one of the constituency relation and the dependency relation of the target sentence.

9. A system, comprising:
  at least one processor; and
  at least one memory communicatively coupled to the at least one processor and comprising computer-readable instructions that upon execution by the at least one processor cause the at least one processor to perform actions comprising:
    obtaining a set of sentences associated with a short text, each of the set of sentences containing all of words in the short text;
    determining a set of syntactic features associated with the set of sentences, each of the set of syntactic features indicating at least one of a constituency relation and a dependency relation of the corresponding sentence; and
    determining a semantic structure of the short text based on the set of syntactic features, the semantic structure comprising a constituent for each of the words.

10. The system of claim 9, wherein determining the semantic structure of the short text comprises:
  determining at least one candidate semantic structure of the short text based on the set of syntactic features;
  determining a frequency of occurrence for each of the at least one candidate semantic structure; and
  ordering the at least one candidate semantic structure based on the frequency of occurrence.

11. The system of claim 10, wherein the set of sentences comprises a target sentence, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence, and determining the at least one candidate semantic structure comprises:
  determining a sub-tree from the target constituency tree, leaf nodes of the sub-tree consisting of all of the words in the short text; and
  restructuring the sub-tree to obtain the target candidate semantic structure.

12. The system of claim 11, wherein restructuring the sub-tree comprises:
  in response to a determination that a part of the short text belongs to a subject and another part of the short text belongs to an object or an adverb,
    determining a predicate as a root node of the sub-tree; and
    determining the constituent and a part-of-speech for each of the words based on the target constituency tree.

13. The system of claim 11, wherein restructuring the sub-tree comprises:
  in response to a determination that all of the words in the short text belong to a same constituent,
    determining a root node of the sub-tree based on the target syntactic feature; and
    determining a part-of-speech for the short text.

14. The system of claim 13, wherein the target syntactic feature further comprises a target dependency tree indicating the dependency relation of the target sentence, and determining the root node comprises:
  determining the root node based on the target dependency tree.

15. The system of claim 9, wherein the short text corresponds to a search query, and obtaining the set of sentences comprises:
  extracting a set of documents associated with the search query from a search log; and
  acquiring the set of sentences from the set of documents.

16. The system of claim 9, wherein the set of sentences comprises a target sentence, determining the set of syntactic features comprises:
  parsing the target sentence to obtain at least one of the constituency relation and the dependency relation of the target sentence.

17. A non-transitory computer-readable storage medium, storing computer-readable instructions that upon execution by a computing device cause the computing device to perform actions comprising:
  obtaining a set of sentences associated with a short text, each of the set of sentences containing all of words in the short text;
  determining a set of syntactic features associated with the set of sentences, each of the set of syntactic features indicating at least one of a constituency relation and a dependency relation of the corresponding sentence; and
  determining a semantic structure of the short text based on the set of syntactic features, the semantic structure comprising a constituent for each of the words.

18. The non-transitory computer-readable storage medium of claim 17, wherein determining the semantic structure of the short text comprises:
  determining at least one candidate semantic structure of the short text based on the set of syntactic features;
  determining a frequency of occurrence for each of the at least one candidate semantic structure; and
  ordering the at least one candidate semantic structure based on the frequency of occurrence.

19. The non-transitory computer-readable storage medium of claim 18, wherein the set of sentences comprises a target sentence, the set of syntactic features comprises a target syntactic feature associated with the target sentence, the target syntactic feature comprises a target constituency tree indicating the constituency relation of the target sentence, the at least one candidate semantic structure comprises a target candidate semantic structure associated with the target sentence, and determining the at least one candidate semantic structure comprises:
  determining a sub-tree from the target constituency tree, leaf nodes of the sub-tree consisting of all of the words in the short text; and
  restructuring the sub-tree to obtain the target candidate semantic structure.

20. The non-transitory computer-readable storage medium of claim 17, wherein the short text corresponds to a search query, and obtaining the set of sentences comprises:
   extracting a set of documents associated with the search query from a search log; and
   acquiring the set of sentences from the set of documents.

* * * * *